United States Patent
Banerjee et al.

(10) Patent No.: US 12,307,360 B2
(45) Date of Patent: May 20, 2025

(54) METHOD AND SYSTEM FOR OPTIMIZED SPIKE ENCODING FOR SPIKING NEURAL NETWORKS

(71) Applicant: Tata Consultancy Services Limited, Mumbai (IN)

(72) Inventors: Dighanchal Banerjee, Kolkata (IN); Sounak Dey, Kolkata (IN); Arijit Mukherjee, Kolkata (IN); Arun George, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 926 days.

(21) Appl. No.: 17/187,912

(22) Filed: Mar. 1, 2021

(65) Prior Publication Data

US 2022/0222522 A1    Jul. 14, 2022

(30) Foreign Application Priority Data

Dec. 4, 2020   (IN) .............................. 202021052964

(51) Int. Cl.
*G06N 3/08*    (2023.01)
*G06N 3/049*   (2023.01)

(52) U.S. Cl.
CPC ............... *G06N 3/08* (2013.01); *G06N 3/049* (2013.01)

(58) Field of Classification Search
CPC .................................. G06N 3/08; G06N 3/049
See application file for complete search history.

(56) References Cited

U.S. PATENT DOCUMENTS

2013/0204819 A1 *   8/2013  Hunzinger  ............... G06N 3/08
                                                            706/25
2013/0325773 A1 *  12/2013  Sinyavskiy ............ G06N 20/00
                                                            706/23

OTHER PUBLICATIONS

Taherkhani, Aboozar and Thomas Martin McGinnity, "Optimization of Output Spike Train Encoding for Spiking Neuron Based on its Spatio-Temporal Input Pattern", Apr. 11, 2019, IEEE, pp. 428 and 437 (Year: 2019).*
University of Washington Math Department, "Math 407", May 4, 2020, University of Washington, p. 1-2 (Year: 2020).*

(Continued)

*Primary Examiner* — Shahid K Khan
*Assistant Examiner* — Skylar K Vanwormer
(74) *Attorney, Agent, or Firm* — Finnegan, Henderson, Farabow, Garrett & Dunner, LLP

(57) ABSTRACT

This disclosure generally relates optimized spike encoding for spiking neural networks (SNNs). The SNN processes data in spike train format, whereas the real world measurements/input signals are in analog (continuous or discrete) signal format; therefore, it is necessary to convert the input signal to a spike train format before feeding the input signal to the SNNs. One of the challenges during conversion of the input signal to the spike train format is to ensure retention of maximum information between the input signal to the spike train format. The disclosure reveals an optimized encoding method to convert the input signal to optimized spike train for spiking neural networks. The disclosed optimized encoding approach enables maximizing mutual information between the input signal and optimized spike train by introducing an optimal Gaussian noise that augments the entire input signal data.

12 Claims, 11 Drawing Sheets

(56) References Cited

OTHER PUBLICATIONS

Jafri, Yasmin Zahra, Amir Waseem, Lalarukh Kamal, S. Masood Raza, Muhammad Sami and Syed Haider Shah, "Chaotic time series prediction and Mackey-Glass simulation with fuzzy logic", Apr. 2012, International Journal of the Physical Sciences, p. 2597 (Year: 2012).*
Chu, Fuchang, Zhenping Fan, Baohui Guo, Dan Zhi, Zijian Yin, Wenjie Zhao, "Variable Selection based on Maximum Information Coefficient for Data Modeling", Oct. 2, 2017, IEEE, p. 1714-1716 (Year: 2017).*
Toyoizumi, Taro, Jean-Pascal Pfister, Kazuyuki Aihara and Wulfram Gerstner, "Spike-Timing Dependent Plasticity and Mutual Information Maximization for a Spiking Neuron Model", 2004, Advances in neural information processing systems (Year: 2004).*
Heeger, David, "Poisson Model of Spike Generation", Sep. 5, 2000, University of Standford, pp. 3-6 (Year: 2000).*
Medini et al., "Spike Encoding for Pattern Recognition: Comparing Cerebellum Granular Layer Encoding and BSA algorithms," 2015 International Conference on Advances in Computing, Communications and Informatics (ICACCI), pp. 1619-1625.
Petro et al., "Selection and Optimization of Temporal Spike Encoding Methods for Spiking Neural Networks," IEEE Transactions on Neural Networks and Learning Systems, pp. 1-13 (2019).
Rathi et al., "DIET-SNN: A Low-Latency Spiking Neural Network with Direct Input Encoding & Leakage and Threshold Optimization," Neural and Evolutionary Computing (cs.NE); Machine Learning, pp. 1-11 (2020).

\* cited by examiner

METHOD AND SYSTEM FOR OPTIMIZED SPIKE ENCODING FOR SPIKING NEURAL NETWORKS

CROSS-REFERENCE TO RELATED APPLICATIONS AND PRIORITY

The present application claims priority from Indian provisional application no. 202021052964, filed on Dec. 4, 2020.

TECHNICAL FIELD

The disclosure herein generally relates to spiking neural networks, and, more particularly, to a method and a system for optimized spike encoding for spiking neural networks.

BACKGROUND

In the recent years, Spiking Neural Networks (SNNs) have gained a lot of popularity for its energy and data efficient edge computing. SNNs have several applications that include image classification, time-series forecasting, gesture recognition from video, etc., The spiking neural network (SNN) is inspired by information processing solutions of the biological brain, wherein the information travels between the processing units in the form of binary spiking. However, the real world measurements/input signals provide analog (continuous or discrete) signals; therefore, it is necessary to implement an encoding method to convert the input signal to spike events. Hence it is extremely important to generate a spike train from the input signal before feeding to the SNN. Hence the efficiency of the SNN systems is subject to optimal encoding of the real-valued signals into spike trains while retaining maximum possible information content.

Typically, the pre-processing (encoding) of input signal for SNN is performed using several methods of which popular ones are—(i) capturing input data in an efficient SNN-compatible manner using modern sensor hardware, and, (ii) using efficient soft encoding techniques on the captured input data. Unfortunately, the method of using modern sensor hardware for capturing real world stimuli is not very efficient but expensive. Further the encoding techniques include (i) rate coding, based on neuron firing rate, and (ii) temporal coding, based on the timing of the spike. However, the encoding techniques does not ensure retention of maximum information, thus making the pre-processing of the input data for SNN less efficient.

SUMMARY

Embodiments of the present disclosure present technological improvements as solutions to one or more of the above-mentioned technical problems recognized by the inventors in conventional systems. For example, in one embodiment, a method for optimized spike encoding for spiking neural networks is provided. The method includes receiving a plurality of input signals from a data source wherein an input signal of the plurality of input signals is a time series signal and the data source comprises of a plurality of sensors. The method further includes introducing a Gaussian noise into the plurality of input signals to obtain a plurality of Gaussian noise introduced signals. The method further includes generating a plurality of initial encoded spike trains from the plurality of Gaussian noise introduced signals based on an encoding technique. The method further includes computing a mutual information (MI) between (i) the plurality of Gaussian noise introduced signals and the (ii) the plurality of initial encoded spike trains based on a MI computation technique, wherein the MI is computed across an entire length of an initial encoded spike train from amongst the plurality of initial encoded spike trains. The method further includes optimizing the mutual information (MI) through an optimization technique by varying the Gaussian noise in the plurality of Gaussian noise introduced signals. The method further includes identifying an initial encoded spike train among the plurality of initial encoded spike trains to obtain an optimized spike train wherein the optimized spike train is identified based on a pre-defined criterion of the MI. The method further includes feeding the optimized spike train to a spiking neural network (SNN) for training the SNN for at least a task.

In another aspect, a system for optimized spike encoding for spiking neural networks is provided. The system includes a memory storing instructions, one or more communication interfaces; and one or more hardware processors coupled to the memory via the one or more communication interfaces, wherein the one or more hardware processors are configured by the instructions for receiving receive a plurality of input signals from a data source, via a one or more hardware processors, wherein an input signal of the plurality of input signals is a time series signal and the data source comprises of a plurality of sensors. The system is further configured to introduce a Gaussian noise into the plurality of input signals, via the one or more hardware processors, to obtain a plurality of Gaussian noise introduced signals. The system is further configured to generate a plurality of initial encoded spike trains from the plurality of Gaussian noise introduced signals, via the one or more hardware processors, based on an encoding technique. The system is further configured to compute a mutual information (MI), via the one or more hardware processors, between (i) the plurality of Gaussian noise introduced signals and the (ii) the plurality of initial encoded spike trains based on a MI computation technique, wherein the MI is computed across an entire length of the plurality of initial encoded spike train. The system is further configured to optimize the mutual information (MI), via the one or more hardware processors, through an optimization technique by varying the plurality of Gaussian noise. The system is further configured to identify an initial encoded spike train among the plurality of initial encoded spike trains to obtain the optimized spike train, via the one or more hardware processors, wherein the optimized spike train is identified based on a pre-defined criteria of the MI. The system is further configured to and feed the optimized spike train, via the one or more hardware processors, to a spiking neural network (SNN) for training the SNN for a task.

In yet another aspect, a non-transitory computer readable medium for optimized spike encoding for spiking neural networks is provided. The program includes receiving a plurality of input signals from a data source wherein an input signal of the plurality of input signals is a time series signal and the data source comprises of a plurality of sensors. The program further includes introducing a Gaussian noise into the plurality of input signals to obtain a plurality of Gaussian noise introduced signals. The program further includes generating a plurality of initial encoded spike trains from the plurality of Gaussian noise introduced signals based on an encoding technique. The program further includes computing a mutual information (MI) between (i) the plurality of Gaussian noise introduced signals and the (ii) the plurality of initial encoded spike trains based on a MI computation technique, wherein the MI is computed across an entire length of an initial encoded spike train from amongst the plurality of initial encoded spike trains. The program further includes optimizing the mutual information (MI) through an optimization technique by varying the Gaussian noise in the plurality of Gaussian noise introduced signals. The program further includes identifying an initial encoded spike train among the plurality of initial encoded spike trains to obtain an optimized spike train wherein the optimized spike train is identified based on a pre-defined criterion of the MI. The program further includes feeding the optimized spike train to a spiking neural network (SNN) for training the SNN for at least a task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
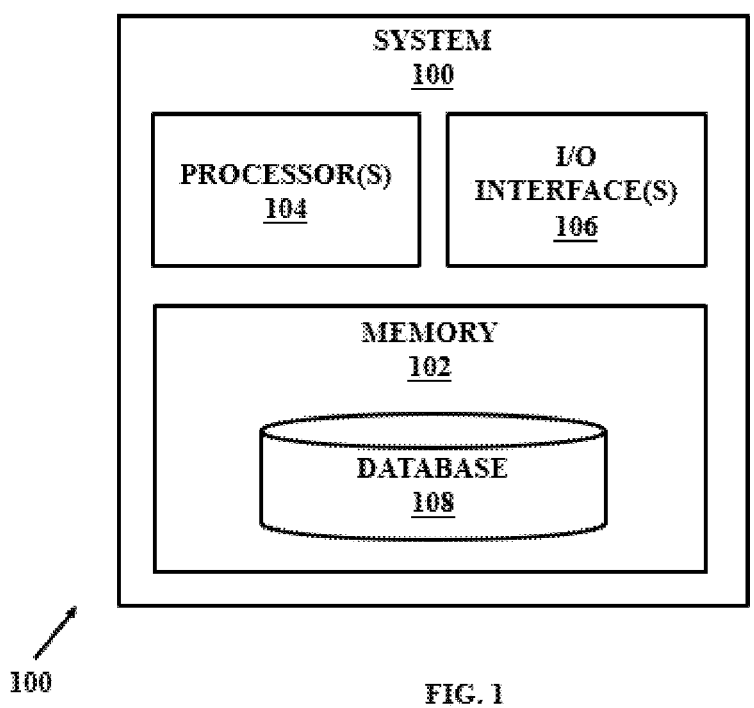
FIG. 1 illustrates an exemplary system for optimized spike encoding for spiking neural networks according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 6 where similar reference characters denote corresponding features consistently throughout the figures, there are shown preferred embodiments and these embodiments are described in the context of the following exemplary system and/or method.

FIG. 1 is a functional block diagram of a system 100 for optimized spike encoding for spiking neural networks in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a database 108. Thus, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of system 100 are explained in conjunction with functional overview of the system 100 in FIG. 2 and flow diagram of FIGS. 3A and 3B for optimized spike encoding for spiking neural networks.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
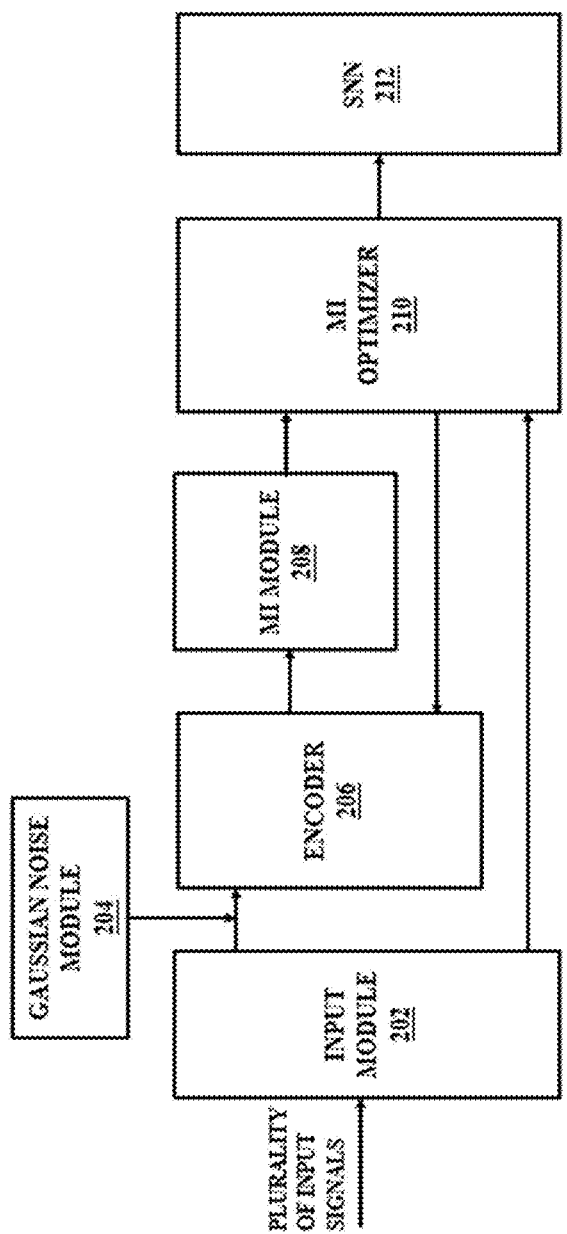
FIG. 2 is a functional block diagram for optimized spike encoding for spiking neural networks according to some embodiments of the present disclosure.

FIG. 2 a system 200, is a functional block diagram of the system 100 of FIG. 1, in accordance with some embodiments of the present disclosure. As depicted in the architecture, the FIG. 2 illustrates the functions of the components of the system 100 that includes for optimized spike encoding for spiking neural networks.

The system 100 for optimized spike encoding for spiking neural networks is configured to receive a plurality of input signals from a data source, via a Input module 202, wherein an input signal of the plurality of input signals is a time series signal and the data source comprises of a plurality of sensors. The system 100 further includes a Gaussian noise module 204 configured for introducing a Gaussian noise into the plurality of input signals to obtain a plurality of Gaussian noise introduced signals. The system 100 further includes an Encoder 206 configured for generating a plurality of initial encoded spike trains from the plurality of Gaussian noise introduced signals based on an encoding technique. The system 100 further includes a MI Module 208 configured for computing a mutual information (MI) between (i) the plurality of Gaussian noise introduced signals and the (ii) the plurality of initial encoded spike trains based on a joint probability mass function (PMF) and a marginal PMF based on a MI computation technique, wherein the MI is computed across an entire length of the plurality of initial encoded spike train. The system 100 further includes a MI Optimizer 210 configured for optimizing the mutual information (MI) through an optimization technique by varying the plurality of Gaussian noise. The MI Optimizer 210 is also configured for identifying an initial encoded spike train among the plurality of initial encoded spike trains to obtain the optimized spike train, wherein the optimized spike train is identified based on a pre-defined criteria of the MI. The system 100 is further configured for feeding the optimized spike train to a spiking neural network (SNN) 212 for training the SNN 212 for performing a plurality of tasks.

The various modules of the system 100 for optimized spike encoding for spiking neural networks are implemented as at least one of a logically self-contained part of a software program, a self-contained hardware component, and/or, a self-contained hardware component with a logically self-contained part of a software program embedded into each of the hardware component that when executed perform the above method described herein.

Figure 3A:
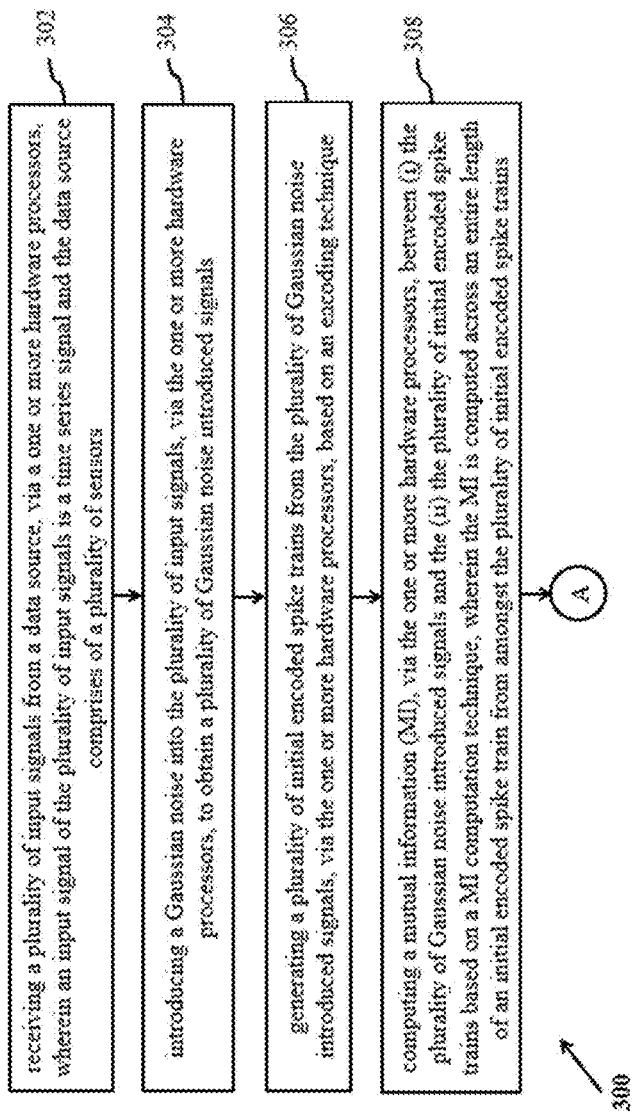
FIG. 3A and FIG. 3B is a flow diagram illustrating a method for optimized spike encoding for spiking neural networks in accordance with some embodiments of the present disclosure.
Figure 3B:
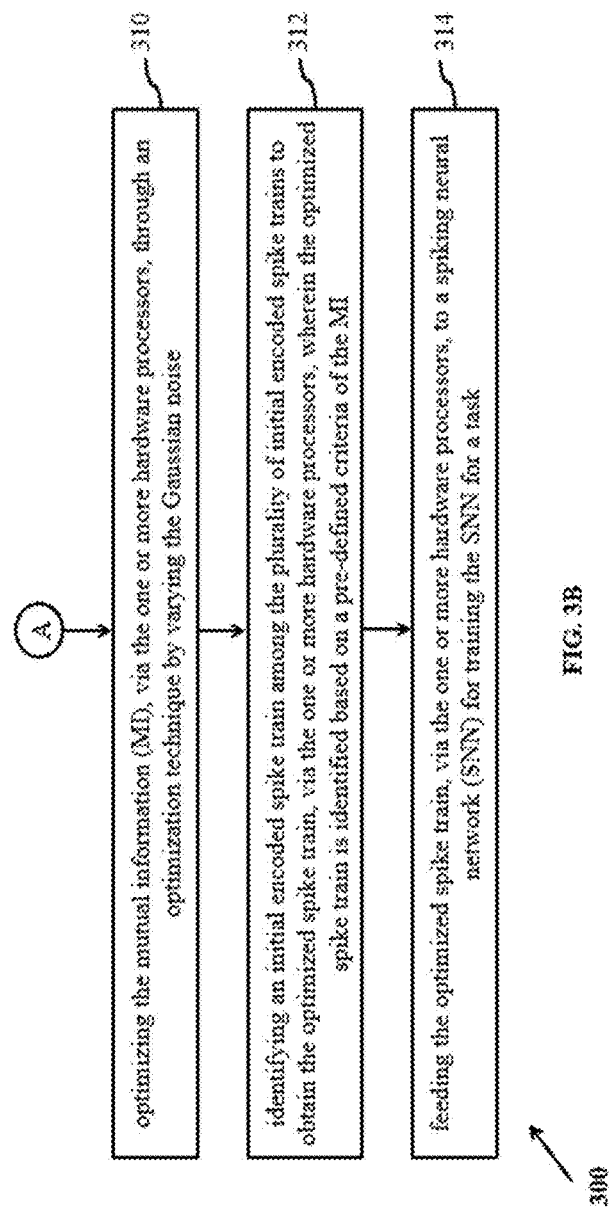

Functions of the components of the system 100 are explained in conjunction with functional modules of the system 100 stored in the memory 102 and further explained in conjunction with flow diagram of FIGS. 3A and 3B. The FIG. 3A and FIG. 3B, with reference to FIG. 1, is an exemplary flow diagram illustrating a method 300 for using the system 100 of FIG. 1 according to an embodiment of the present disclosure.

The steps of the method of the present disclosure will now be explained with reference to the components for optimized spike encoding for spiking neural networks (100) and the modules (201-212) as depicted in FIG. 2 and the flow diagrams as depicted in FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of input signals is received from a data source, via the one or more hardware processors in the input module 202. The plurality of input signals comprises of several input signals, wherein each the input signal is a time series signal and the data source comprise of a plurality of sensors.

In an embodiment, the time series signal includes a Mackey-Glass Time series (MGS), wherein the MGS is a non-linear chaotic time-series generated by a delay differential equation. In yet another embodiment, the time series signal includes a shampoo sales data, wherein the shampoo sales data is an aperiodic and a chaotic dataset. In another embodiment, the time series signal includes a sunspot data, wherein the sunspot data is a periodic and a non-stationary dataset. In another embodiment, the time series signal includes a bike sharing, wherein the bike sharing is an aperiodic and a non-stationary dataset.

In an embodiment, the plurality of sensors includes a plurality of data associated with a domain specific data. A few example scenarios of sensors include receiving data associated with a temperature data from a temperature sensor, receiving data regarding movement from an Inertial Measurement Unit (IMU) sensor, receiving data regarding location data from a GPS sensor, receiving data regarding finance or stock using a plurality of soft sensors or repositories.

At step 304 of the method (300), a Gaussian noise is introduced into the plurality of input signals, via the one or more hardware processors in the Gaussian noise module 204, to obtain a plurality of Gaussian noise introduced signals.

Figure 4:
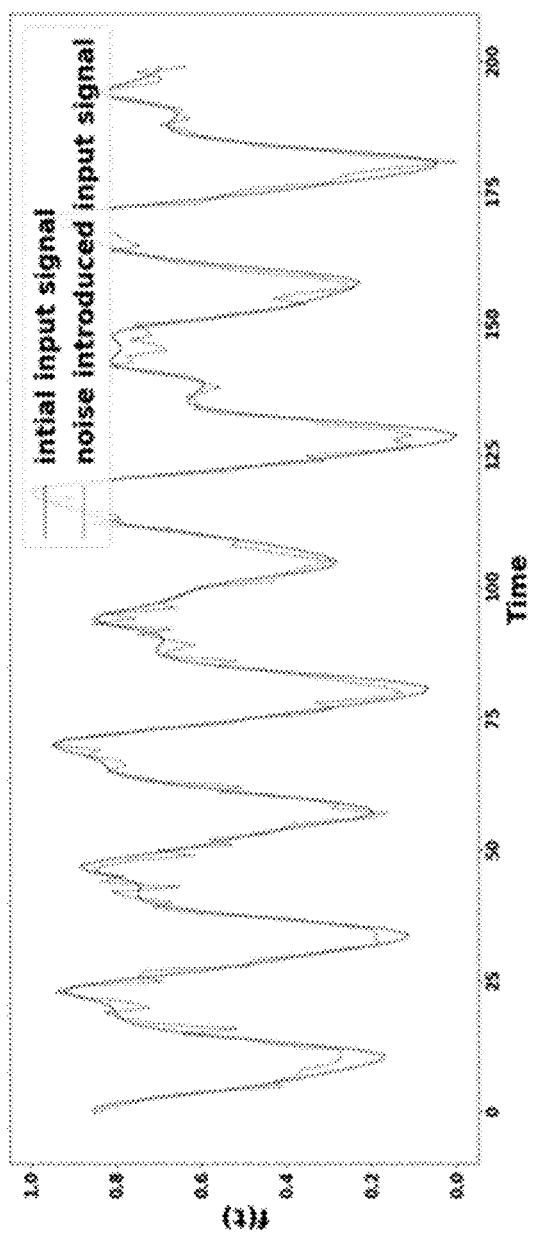
FIG. 4 is a graph illustrating a plurality of time series input signals and a corresponding Gaussian noise introduced signals associated with the system of FIG. 2 in accordance with some embodiments of the present disclosure.

In an embodiment, FIG. 4 illustrates a graph with a plurality of time series input signals and a corresponding Gaussian noise introduced signals, wherein the time series input signals and the corresponding Gaussian noise introduced signals are plotted with time in x-axis and the signal in y-axis.

At step 306 of the method (300), a plurality of initial encoded spike trains is generated from the plurality of Gaussian noise introduced signals, via the one or more hardware processors in the encoder 206, based on an encoding technique.

In an embodiment, the encoding techniques includes a non-temporal neural coding schemes that comprises a Poisson encoding technique, a Bernoulli encoding technique. In an example scenario, the plurality of initial encoded spike trains is generated based on a Poisson encoding technique, wherein the Poisson encoding technique is expressed mathematically as shown below:

$$P(n \text{ spikes during } (t_1, t_2)) = e^{(\langle n \rangle)} \frac{|\langle n \rangle|^n}{n!}$$

where $\langle n \rangle$ is the average spike count given by $$\langle n \rangle = \int_{t_1}^{t_2} r(t) dt$$

where,
P is a probability of an event,
n is number of spikes,
$(t_2-t_1)$ is time interval,
$\langle n \rangle$ is an average spike count,
r(t) is an instantaneous rate of generating spikes during the encoding process, and
dt is a small time sub-interval.

At step 308 of the method (300), a mutual information (MI) is computed, via the one or more hardware processors in the MI Module 208. The MI is computed between (i) the plurality of Gaussian noise introduced signals and the (ii) the plurality of initial encoded spike trains based on a joint probability mass function (PMF) and a marginal PMF based on a MI computation technique. The MI is computed across an entire length of the plurality of initial encoded spike train.

In an embodiment, the mutual information (MI) is a measure of an information content within the plurality of initial encoded spike trains generated via encoding of the plurality of input signals. Hence, while encoding an input signal into spike trains, MI can be used to measure how much information the spike train carries about the original data. Further in the disclosed method, the MI is computed across an entire length of the plurality of initial encoded spike train against the well-known practice of considering only a small segment within the plurality of initial encoded spike train.

The MI computation technique is expressed mathematically as explained in this section in several steps that includes calculation of entropy of a random variable (H(X)), further the MI I(X; Y) is computed based on the entropy as shown below:

$$H(X) = -\sum_{x \in \chi} P_X(x) \log P_X(x)$$

$$I(X; Y) = \sum_{(x,y) \in X \times Y} P_{XY}(x, y) \log \frac{P_{XY}(x, y)}{P_X(x) P_Y(y)}$$

$$I(X; Y) = H(X) - H(X \mid Y)$$

where,
$P_X(x)$ is a probability of a random variable X taking the value x,
$P_Y(y)$ is a probability of a random variable Y taking the value y,
H is entropy,
I is the mutual information, and
$P_{XY}(x, y)$ is a joint PMF of two random variables X and Y.

At step 310 of the method (300), the mutual information (MI) is optimized, via the one or more hardware processors in the MI Optimizer 210, through an optimization technique by varying the plurality of Gaussian noise.

In an embodiment, the optimization technique is expressed mathematically as shown below:

$$\text{maximize}_\sigma I(T_\sigma; S)$$

$$\text{subject } I(T_\sigma; S) \geq I(T; S)$$

where,
S is the plurality of input signals,
T is the initial encoded spike train,
σ is the guassian noise,
$T_\sigma$ is the guassian noise introduced initial encoded spike train, and
I is the mutual information.

At step 312 of the method (300), an initial encoded spike train is identified among the plurality of initial encoded spike trains to obtain the optimized spike train, via the one or more hardware processors in the MI Optimizer 210. The optimized spike train is identified based on a pre-defined criterion of the MI.

In an embodiment, the pre-defined criteria of the MI is defined as the initial encoded spike train comprising a maximum MI among the plurality of initial encoded spike trains. Hence the process of identification of the optimized spike train is maximizing mutual information (MI) between the initial encoded spike trains and the plurality of input signals by varying the plurality of Gaussian noise.

At step 314 of the method (300) the optimized spike train is fed, via the one or more hardware processors, to a SNN 212 for training the SNN for a task.

In an embodiment, the task to be performed by the SNN comprises of signal re-construction, classification, prediction and pattern recognition. In an example scenario, the SNN is trained to learn temporal dynamics of the optimized spike train. The post-synaptic trace of the SNN is then fed into a Linear Regression module with corresponding real values from the input signal as labels to learn (during training) and then to reconstruct the data from the unseen parts of it during validation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

EXPERIMENTAL RESULTS

Figure 5:
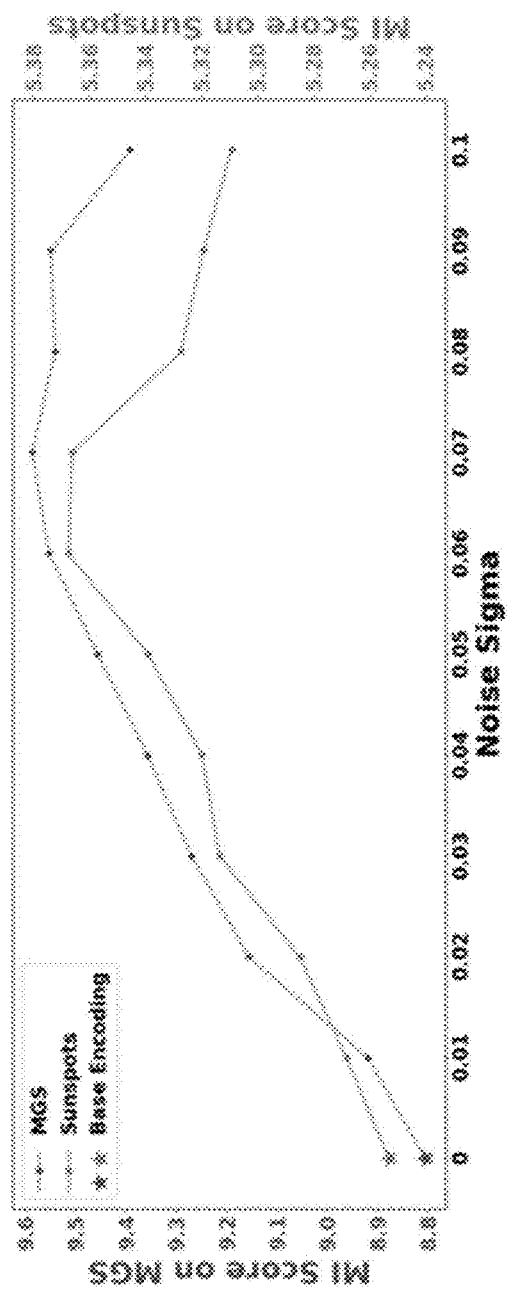
FIG. 5 is a is a graph illustrating the mutual information score varying with respect to different Gaussian noise for a Mackey-Glass Time series (MGS) dataset associated with the system of FIG. 2 in accordance with some embodiments of the present disclosure.
Figure 6:
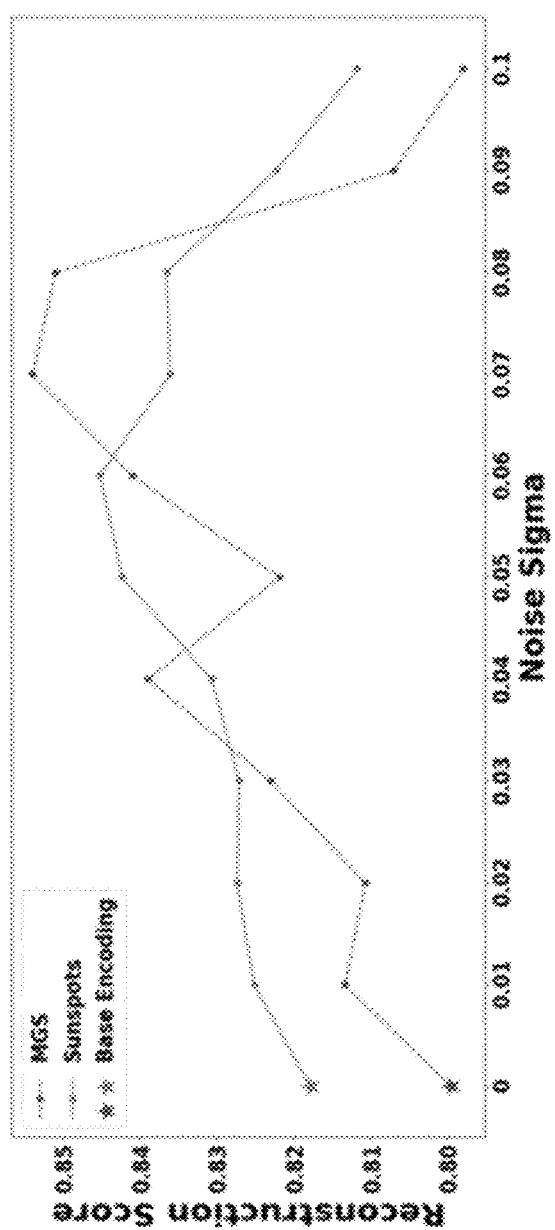
FIG. 6 is a graph illustrating the effect of increasing noise on a reconstruction score, associated with the system of FIG. 2 in accordance with some embodiments of the present disclosure.
Figure 7:
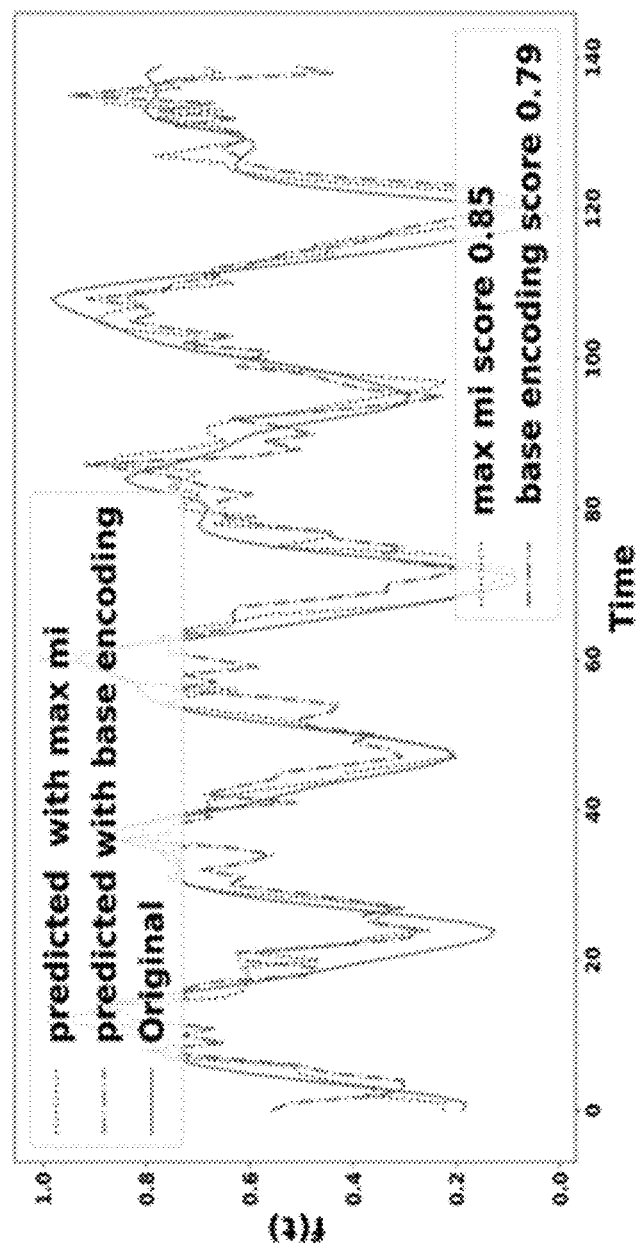
FIG. 7 is a graph illustrating an example scenario of comparison between an input signal (Mackey-Glass Time series—MGS), a reconstructed MGS signal using a base encoding technique and a reconstructed MSG signal with using the disclosed optimized encoding, in accordance with some embodiments of the present disclosure.

An experiment has been conducted using the time series signal includes a Mackey-Glass Time series (MGS), wherein the MGS is a non-linear chaotic time-series generated by a delay differential equation. Each dataset of the MGS has been partitioned into a training set and a testing set based on a pre-defined train:test ratio. The training set is encoded by the disclosed method of optimizing the mutual information. Further for each case, the encoded training set is used to train a spiking reservoir network (SNN) to reconstruct the time series and then the reconstruction score was measured using the testing set. The reconstruction efficiency of the SNN is measured using a Coefficient of determination Score) metric, also referred as reconstruction score. The FIG. 5 illustrates the mutual information score varies with respect to different Gaussian noise (σ). As can be seen from the FIG. 5, the quantity mutual information increases as the input noise increases and decreases after a certain noise level (σ=0.07, in this case) making the whole signal too noisy and unusable. So, this inflection point corresponding to σ=0.07 can be considered as the optimized mutual information available between the input data and the encoded spike train. The corresponding spike train is considered as the optimized spike train which carries maximum information about MGS time series data. Further, the effect of increasing noise (and in turn changing MI) on the learning capability of SNN on a Linear Regression module can be observed in terms of reconstruction score for the validation part of the time series data. The effect of increasing noise on reconstruction score (for MGS) is reported in FIG. 6, wherein it is to be noted that the reconstruction performance of the SNN improves when compared to base encoding with the increase of noise. Maximum reconstruction score of 0.85 is achieved for the highest mutual information score (9.58) for σ=0.07. After reaching the optimum point, the reconstruction score decreases due to high noise and eventually comes below the performance of the base encoding. The FIG. 7 illustrates the reconstructed signal for the MGS data, wherein the reconstructed signal for the MGS test data is plotted with time in x-axis and the signal in y-axis.

Figure 8:
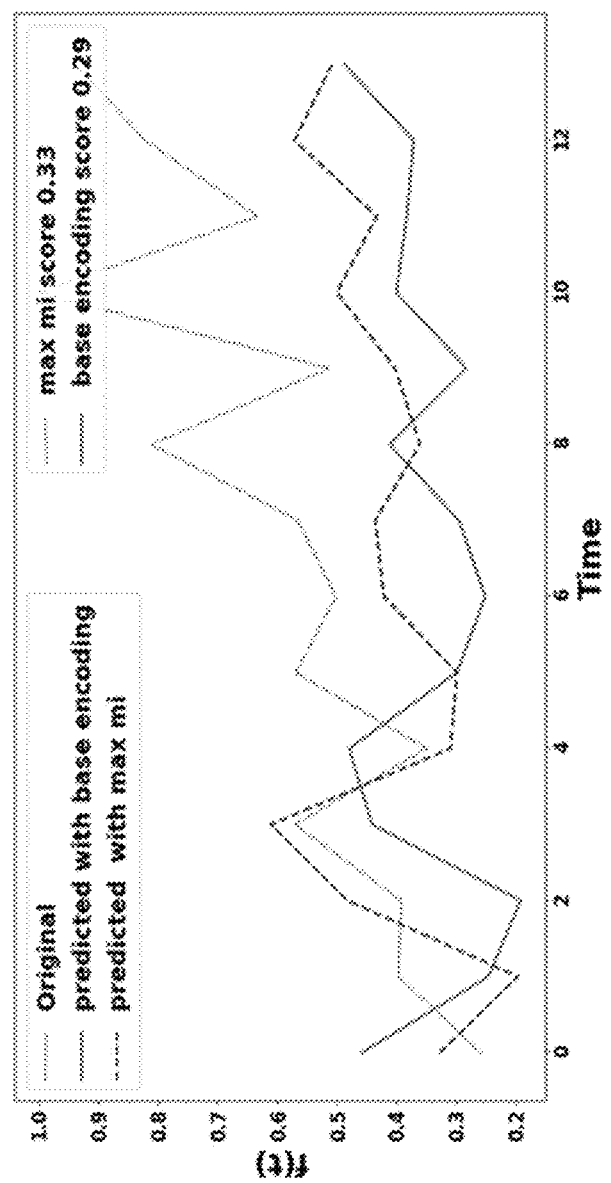
FIG. 8 is a graph illustrating an example scenario of comparison between an input signal (shampoo sales data set), a reconstructed signal of the input signal using a base encoding technique and a reconstructed signal of the input signal using the disclosed optimized encoding, in accordance with some embodiments of the present disclosure.

A similar experimentation has been performed on a time series data with "Shampoo Sales"—the monthly count of sales of shampoo over a three year period (36 observations. The FIG. 8 is a graph illustrating an example scenario of comparison between an input signal (shampoo sales data set), a reconstructed signal of the input signal using a base encoding technique and a reconstructed signal of the input signal using the disclosed optimized encoding. In the FIG. 8, the input signal, the reconstructed signal of the input signal using a base encoding technique and a reconstructed signal of the input signal for the shampoo sales test data is plotted with time in x-axis and the signal in y-axis.

Figure 9:
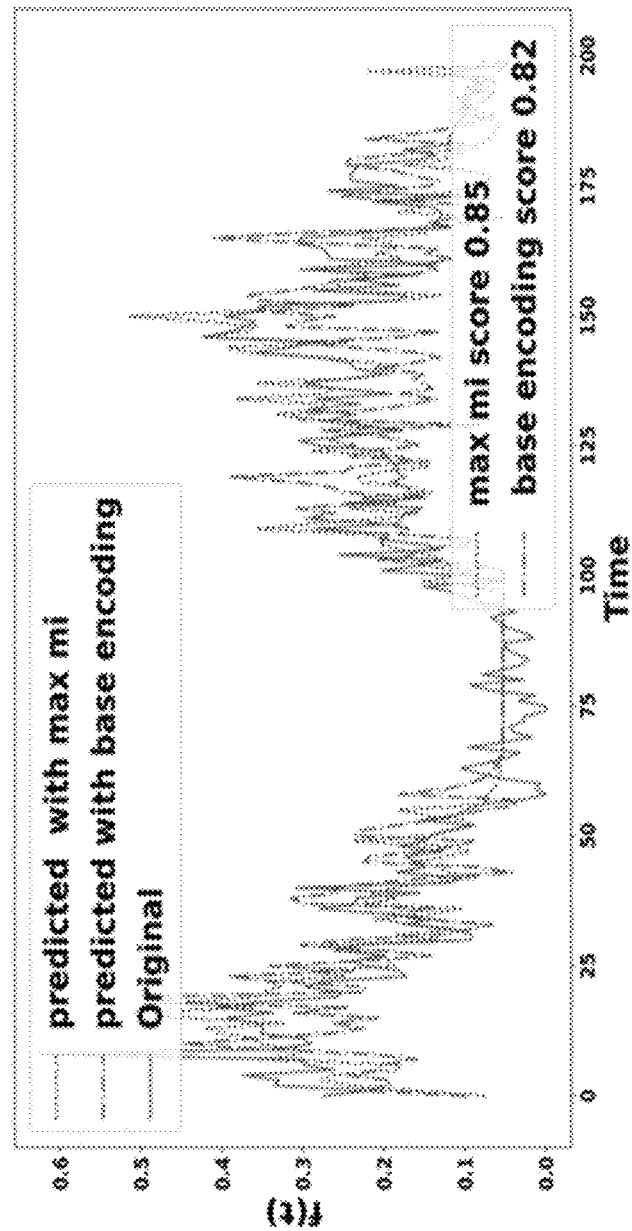
FIG. 9 is a graph illustrating an example scenario of comparison between an input signal (sun spot data set), a reconstructed signal of the input signal using a base encoding technique and a reconstructed signal of the input signal using the disclosed optimized encoding, in accordance with some embodiments of the present disclosure.

A similar experimentation using the disclosed method has been performed on a time series data with "Sun Spot"—a monthly count of observed sunspots for from 1749 to 1983 (2820 observations). The FIG. 9 is a graph illustrating an example scenario of comparison between an input signal (sun spot data set), a reconstructed signal of the input signal using a base encoding technique and a reconstructed signal of the input signal using the disclosed optimized encoding. In the FIG. 9, the input signal, the reconstructed signal of the input signal using a base encoding technique and a reconstructed signal of the input signal for the shampoo sales test data is plotted with time in x-axis and the signal in y-axis.

Figure 10:
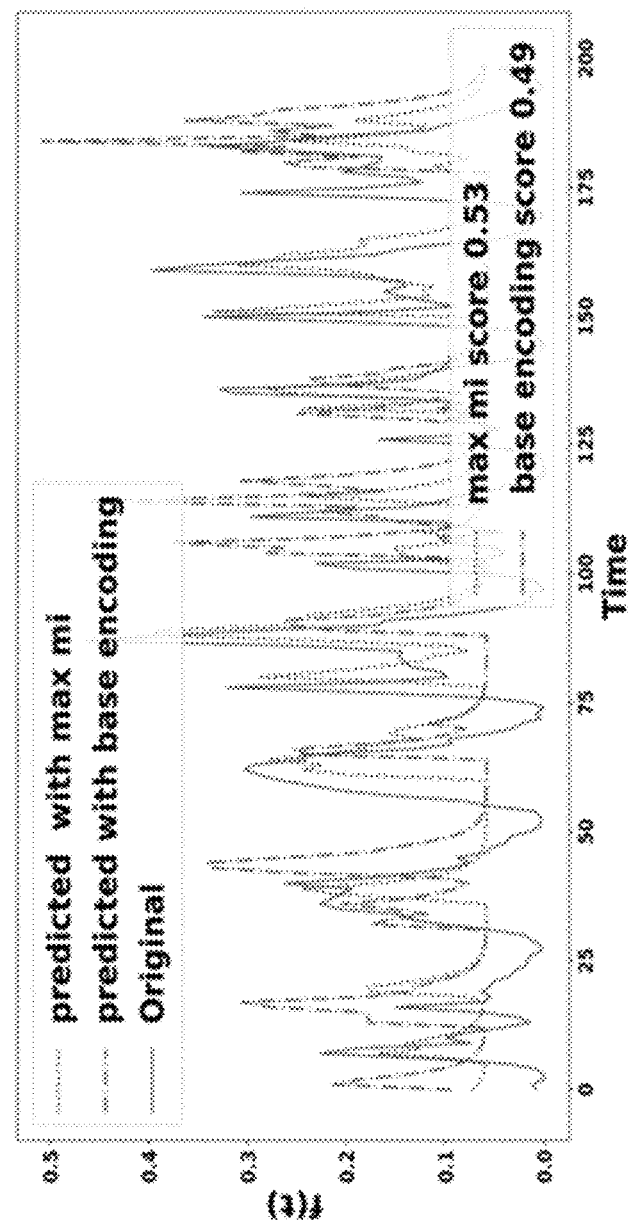
FIG. 10 is a graph illustrating an example scenario of comparison between an input signal (bike sharing data set), a reconstructed signal of the input signal using a base encoding technique and a reconstructed signal of the input signal using the disclosed optimized encoding, in accordance with some embodiments of the present disclosure.

A similar experimentation has been performed using the disclosed method on a time series data with Bike Sharing—hourly count of bike rentals for two years (2011-12) in Capital bike share system 17800 observations). The FIG. 10 is a graph illustrating an example scenario of comparison between an input signal (Bike Sharing data set), a reconstructed signal of the input signal using a base encoding technique and a reconstructed signal of the input signal using the disclosed optimized encoding. In the FIG. 10, the input signal, the reconstructed signal of the input signal using a base encoding technique and a reconstructed signal of the input signal for the shampoo sales test data is plotted with time in x-axis and the signal in y-axis.

Further the change in MI and reconstruction score for the MGS and the Shampoo Sales using a base encoding technique (B) and the disclosed maximizing MI technique (MI) is shown below in Table.1:

TABLE 1

MI and reconstruction score for the MGS, the shampoo sales, the sun spot and the bike sharing for base encoding technique (B) and the disclosed maximizing MI technique (MI).

| Train and test ratio | Reconstruction Signal | | | | | | | |
|---|---|---|---|---|---|---|---|---|
| | MGS | | Shampoo sales | | Sun spot | | Bike sharing | |
| | B | MI | B | MI | B | MI | B | MI |
| 1:4 | 0.76 | 0.78 | 0.21 | 0.21 | 0.80 | 0.81 | 0.46 | 0.47 |
| 2:3 | 0.78 | 0.81 | 0.26 | 0.28 | 0.82 | 0.83 | 0.48 | 0.49 |
| 3:2 | 0.79 | 0.85 | 0.29 | 0.33 | 0.81 | 0.84 | 0.50 | 0.52 |
| 4:1 | 0.75 | 0.75 | 0.29 | 0.3 | 0.81 | 0.81 | 0.48 | 0.53 |

Based on the experimental details captured in Table.1, in each case, the disclosed MI based encoding technique achieved higher reconstruction scores (maximum 8%, 14%, 4%, 10% for MGS, Shampoo sales, Sunspot & Bike sharing dataset respectively) than the base encoding technique.

This disclosure generally relates optimized spike encoding for spiking neural networks (SNNs). The SNN processes data in spike train format, whereas the real world measurements/input signals are in analog (continuous or discrete) signal format; therefore, it is necessary to convert the input signal to a spike train format before feeding the input signal to the SNNs. One of the challenges during conversion of the input signal to the spike train format is to ensure retention of maximum information between the input signal to the spike train format. The disclosure reveals an optimized encoding method to convert the input signal to optimized spike train for spiking neural networks. The disclosed optimized encoding approach enables maximizing mutual information between the input signal and optimized spike train by introducing an optimal Gaussian noise that augments the entire input signal data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor-implemented method for optimized spike encoding for spiking neural networks (300) comprising:
receiving a plurality of input signals from a data source, via a one or more hardware processors, wherein an input signal of the plurality of input signals is a time series signal and the data source comprises of a plurality of sensors, wherein the time series signal is a Mackey-Glass Time series (MGS) having a non-linear chaotic time-series generated by a delay differential equation (302);
introducing a Gaussian noise into the plurality of input signals, via the one or more hardware processors, to obtain a plurality of Gaussian noise introduced signals (304);
generating a plurality of initial encoded spike trains from the plurality of Gaussian noise introduced signals, via the one or more hardware processors, based on an encoding technique (306), wherein the encoding technique comprises a non-temporal neural coding scheme that comprises a Poisson encoding technique, and wherein Poisson encoding technique is expressed mathematically as shown below:

$$P(n \text{ spikes during } (t_1, t_2)) = e^{(<n>)}\frac{|<n>|^n}{n!}$$

where <n> is the average spike count given by $$<n> = \int_{t_1}^{t_2} r(t)dt$$

where,
P is a probability of an event,
n is number of spikes,
$(t_2-t_1)$ is time interval,
<n> is an average spike count,
r(t) is an instantaneous rate of generating spikes during the encoding process, and
dt is a small time sub-interval;
computing a mutual information (MI), via the one or more hardware processors, between (i) the plurality of Gaussian noise introduced signals and the (ii) the plurality of initial encoded spike trains based on a MI computation technique, wherein the MI is computed across an entire length of an initial encoded spike train from amongst the plurality of initial encoded spike trains (308);
optimizing the mutual information (MI), via the one or more hardware processors, through an optimization technique that maximizes the MI by varying the Gaussian noise in the plurality of Gaussian noise introduced signals (310);
identifying an initial encoded spike train among the plurality of initial encoded spike trains to obtain an optimized spike train, via the one or more hardware processors, wherein the optimized spike train is identified based on a pre-defined criteria of the MI, wherein the mutual information increases with increase in an input noise and decreases after a noise level of 0.07 and an inflection point corresponding to the noise level is considered as the optimized mutual information available between the input signal and the initial encoded spike train, and the corresponding spike train is considered as the optimized spike train which carries maximum information about the MGS (312);
feeding the optimized spike train, via the one or more hardware processors, to a spiking neural network (SNN) for training the SNN for at least a task (314);
training, via the one or more hardware processors, the SNN using the optimized spike train, wherein the SNN is trained to learn temporal dynamics of the optimized spike train, and a post-synaptic trace of the SNN is then fed into a Linear Regression module with corresponding real values from the plurality of input signals as labels to learn during training and to reconstruct the plurality of input signals; and
reconstructing the plurality of input signals, via the one or more hardware processors, using the SNN by increasing noise and changing the MI on learning capability of the SNN on the Linear Regression module to improve a reconstruction performance of the SNN when compared to a base encoding technique, wherein the reconstruction performance of the SNN is measured using a reconstruction score, and wherein the reconstructed plurality of input signals captures a real world stimuli from the time series signal.

2. The method of claim 1, wherein the task for the SNN comprises of signal re-construction, classification, prediction and pattern recognition.

3. The method of claim 1, wherein the encoding technique comprises a non-temporal neural coding scheme that comprises a Bernoulli encoding technique.

4. The method of claim 1, wherein the mutual information (MI) is a measure of an information content within the plurality of initial encoded spike trains generated via encoding of the plurality of input signals.

5. The method of claim 1, the MI computation technique is expressed mathematically as shown below:

$$H(X) = -\sum_{x \in \chi} P_X(x) \log P_X(x)$$

$$I(X;Y) = \sum_{(x,y) \in X \times Y} P_{XY}(x,y) \log \frac{P_{XY}(x,y)}{P_X(x) P_Y(y)}$$

$$I(X;Y) = H(X) - H(X|Y)$$

where,
$P_X(x)$ is a probability of a random variable X taking the value x,
$P_Y(y)$ is a probability of a random variable Y taking the value y,
H is entropy,
I is the mutual information, and
$P_{XY}(x,y)$ is a joint probability mass function (PMF) of two random variables X and Y.

6. The method of claim 1, wherein the optimization technique is expressed mathematically as shown below:

$$\text{maximize}_\sigma I(T_\sigma; S)$$

$$\text{subject } I(T_\sigma; S) >= I(T; S)$$

where,
S is the plurality of input signals,
T is the initial encoded spike train,
σ is the guassian noise,
$T_\sigma$ is the guassian noise introduced initial encoded spike train, and
I is the mutual information.

7. The method of claim 1, wherein the pre-defined criteria of the MI is defined as determining the initial encoded spike train comprising a maximum MI among the plurality of initial encoded spike trains.

8. A system (100), comprising:
an input/output interface (106);
one or more memories (102); and
one or more hardware processors (104), the one or more memories (102) coupled to the one or more hardware processors (104), wherein the one or more hardware processors (104) are configured to execute programmed instructions stored in the one or more memories (102), to:
receive a plurality of input signals from a data source, via a one or more hardware processors, wherein an input signal of the plurality of input signals is a time series signal and the data source comprises of a plurality of sensors, wherein the time series signal is a Mackey-Glass Time series (MGS) having a non-linear chaotic time-series generated by a delay differential equation;
introduce a Gaussian noise into the plurality of input signals, via the one or more hardware processors, to obtain a plurality of Gaussian noise introduced signals;
generate a plurality of initial encoded spike trains from the plurality of Gaussian noise introduced signals, via the one or more hardware processors, based on an encoding technique, wherein the encoding technique comprises a non-temporal neural coding scheme that comprises a Poisson encoding technique, and wherein Poisson encoding technique is expressed mathematically as shown below:

$$P(n \text{ spikes during } (t_1, t_2)) = e^{(<n>)} \frac{|<n>|^n}{n!}$$

where <n> is the average spike count given by $$<n> = \int_{t_1}^{t_2} r(t) dt$$

where,
P is a probability of an event,
n is number of spikes,
$(t_2-t_1)$ is time interval,
<n> is an average spike count,
r(t) is an instantaneous rate of generating spikes during the encoding process, and
dt is a small time sub-interval;
compute a mutual information (MI), via the one or more hardware processors, between (i) the plurality of Gaussian noise introduced signals and the (ii) the plurality of initial encoded spike trains based on a MI computation technique, wherein the MI is computed across an entire length of an initial encoded spike train from amongst the plurality of initial encoded spike trains;
optimize the mutual information (MI), via the one or more hardware processors, through an optimization technique that maximizes the MI by varying the Gaussian noise in the plurality of Gaussian noise introduced signals;
identify an initial encoded spike train among the plurality of initial encoded spike trains to obtain an optimized spike train, via the one or more hardware processors, wherein the optimized spike train is identified based on a pre-defined criteria of the MI, wherein the mutual information increases with increase in an input noise and decreases after a noise level of 0.07 and an inflection point corresponding to the noise level is considered as the optimized mutual information available between the input signal and the initial encoded spike train, and the corresponding spike train is considered as the optimized spike train which carries maximum information about the MGS;
feed the optimized spike train, via the one or more hardware processors, to a spiking neural network (SNN) for training the SNN for at least a task;
train the SNN using the optimized spike train, wherein the SNN is trained to learn temporal dynamics of the optimized spike train, and a post-synaptic trace of the SNN is then fed into a Linear Regression module with corresponding real values from the plurality of input signals as labels to learn during training and to reconstruct the plurality of input signals; and reconstruct the plurality of input signals using the SNN by increasing noise and changing the MI on learning capability of the SNN on the Linear Regression module to improve a reconstruction performance of the SNN when compared to a base encoding technique, wherein the reconstruction performance of the SNN is measured using a reconstruction score, and wherein the reconstructed plurality of input signals captures a real world stimuli from the time series signal.

9. The system of claim 8, wherein the one or more hardware processors are configured by the instructions for implementing the encoding technique wherein the encoding technique includes a non-temporal neural coding scheme that comprises a Bernoulli encoding technique.

10. The system of claim 8, wherein the one or more hardware processors are configured by the instructions for implementing the MI computation technique expressed mathematically as shown below:

$$H(X) = -\sum_{x \in \chi} P_X(x) \log P_X(x)$$

$$I(X;Y) = \sum_{(x,y) \in X \times Y} P_{XY}(x,y) \log \frac{P_{XY}(x,y)}{P_X(x)P_Y(y)}$$

$$I(X;Y) = H(X) - H(X|Y)$$

where,
$P_X(x)$ is a probability of a random variable X taking the value x,
$P_Y(y)$ is a probability of a random variable Y taking the value y,
H is entropy,
I is the mutual information, and
$P_{XY}(x,y)$ is a joint probability mass function (PMF) of two random variables X and Y.

11. The system of claim 8, wherein the one or more hardware processors are configured by the instructions for implementing the optimization technique expressed mathematically as shown below:

$$\text{maximize}_\sigma I(T_\sigma; S)$$

$$\text{subject } I(T_\sigma; S) >= I(T; S)$$

where,
S is the plurality of input signals,
T is the initial encoded spike train,
σ is the guassian noise,
$T_\sigma$ is the guassian noise introduced initial encoded spike train, and
I is the mutual information.

12. A non-transitory computer-readable medium having embodied thereon a computer readable program for optimized spike encoding for spiking neural networks wherein the computer readable program, when executed by one or more hardware processors, causes:

receiving a plurality of input signals from a data source, via a one or more hardware processors, wherein an input signal of the plurality of input signals is a time series signal and the data source comprises of a plurality of sensors, wherein the time series signal is a Mackey-Glass Time series (MGS) having a non-linear chaotic time-series generated by a delay differential equation;

introducing a Gaussian noise into the plurality of input signals, via the one or more hardware processors, to obtain a plurality of Gaussian noise introduced signals;

generating a plurality of initial encoded spike trains from the plurality of Gaussian noise introduced signals, via the one or more hardware processors, based on an encoding technique, wherein the encoding technique comprises a non-temporal neural coding scheme that comprises a Poisson encoding technique, and wherein Poisson encoding technique is expressed mathematically as shown below:

$$P(n \text{ spikes during } (t_1, t_2)) = e^{(<n>)} \frac{|<n>|^n}{n!}$$

where <n> is the average spike count given by $$<n> = \int_{t_1}^{t_2} r(t) dt$$

where,
P is a probability of an event,
n is number of spikes,
$(t_2-t_1)$ is time interval,
<n> is an average spike count,
r(t) is an instantaneous rate of generating spikes during the encoding process, and
dt is a small time sub-interval;

computing a mutual information (MI), via the one or more hardware processors, between (i) the plurality of Gaussian noise introduced signals and the (ii) the plurality of initial encoded spike trains based on a MI computation technique, wherein the MI is computed across an entire length of an initial encoded spike train from amongst the plurality of initial encoded spike trains;

optimizing the mutual information (MI), via the one or more hardware processors, through an optimization technique that maximizes the MI by varying the Gaussian noise in the plurality of Gaussian noise introduced signals;

identifying an initial encoded spike train among the plurality of initial encoded spike trains to obtain an optimized spike train, via the one or more hardware processors, wherein the optimized spike train is identified based on a pre-defined criteria of the MI, wherein the mutual information increases with increase in an input noise and decreases after a noise level of 0.07 and an inflection point corresponding to the noise level is considered as the optimized mutual information available between the input signal and the initial encoded spike train, and the corresponding spike train is considered as the optimized spike train which carries maximum information about the MGS;

feeding the optimized spike train, via the one or more hardware processors, to a spiking neural network (SNN) for training the SNN for at least a task;

training, via the one or more hardware processors, the SNN using the optimized spike train, wherein the SNN is trained to learn temporal dynamics of the optimized spike train, and a post-synaptic trace of the SNN is then fed into a Linear Regression module with corresponding real values from the plurality of input signals as labels to learn during training and to reconstruct the plurality of input signals; and reconstructing the plurality of input signals, via the one or more hardware processors, using the SNN by increasing noise and changing the MI on learning capability of the SNN on the Linear Regression module to improve a reconstruction performance of the SNN when compared to a base encoding technique, wherein the reconstruction performance of the SNN is measured using a reconstruction score, and wherein the reconstructed plurality of input signals captures a real world stimuli from the time series signal.

* * * * *